D. H. GILSON.
DRIVING ATTACHMENT FOR TRACTORS.
APPLICATION FILED JULY 22, 1921.
1,421,076.
Patented June 27, 1922.
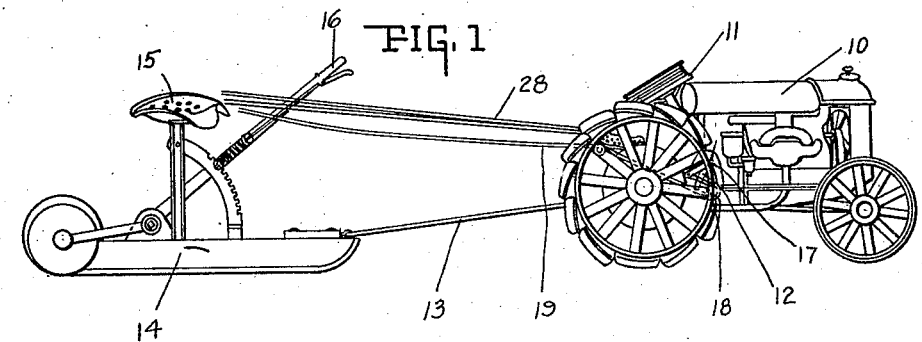
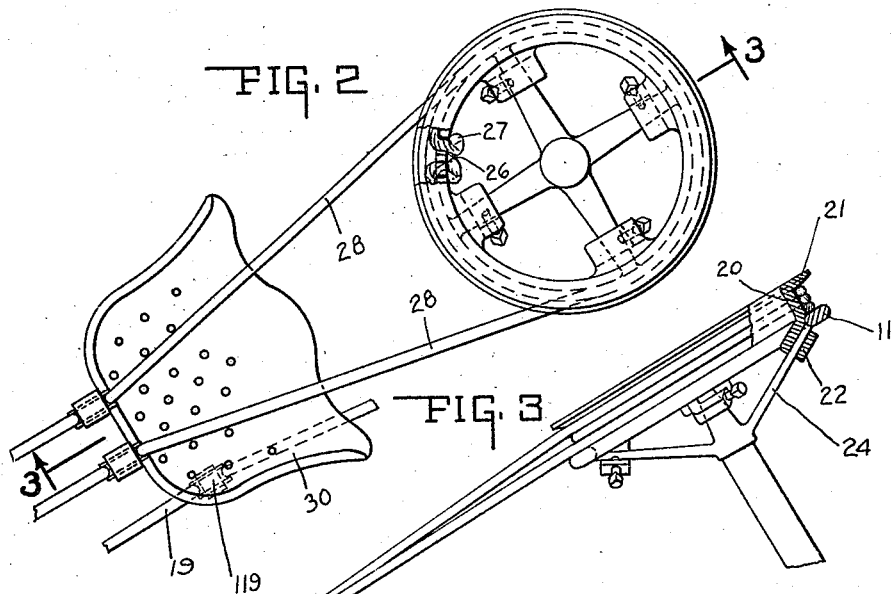
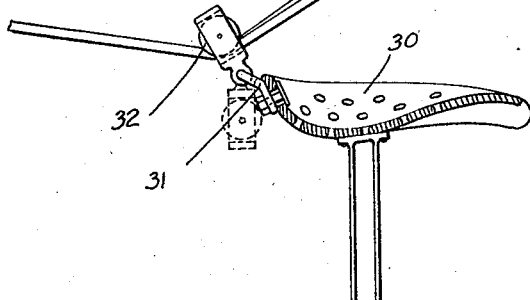
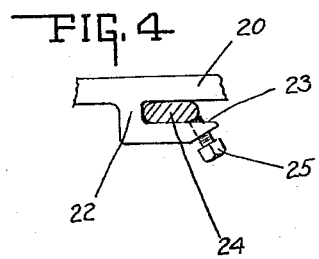
INVENTOR.
DAYTON H. GILSON.
BY
ATTORNEYS.

UNITED STATES PATENT OFFICE.

DAYTON H. GILSON, OF RUSHVILLE, INDIANA.

DRIVING ATTACHMENT FOR TRACTORS.

1,421,076.  Specification of Letters Patent.  Patented June 27, 1922.

Application filed July 22, 1921. Serial No. 486,793.

*To all whom it may concern:*

Be it known that I, DAYTON H. GILSON, a citizen of the United States, and a resident of Rushville, county of Rush, and State of Indiana, have invented a certain new and useful Driving Attachment for Tractors; and I do hereby declare that the following is a full, clear, and exact description thereof, reference being had to the accompanying drawings, in which like numerals refer to like parts.

This invention relates to an attachment for a self-propelled tractive vehicle commonly known as a tractor, and the chief object of the invention is to provide means which may be associated with the usual steering means of a tractor which may be operable from another vehicle, such as an agricultural implement or the like.

The chief feature of the invention consists in providing means which are associated with the usual steering means of a tractor which may be operated from an agricultural implement moved by the tractor.

Another feature of the invention consists in the provision of means whereby the power supplied to the tractor may be controlled from the agricultural implement.

Still a further feature of the invention consists in constructing the several parts of the same such that when desired the tractor may be steered in the usual manner without removing the control means from the steering means of the tractor.

Another feature of the invention consists in the simplicity of the construction of the attachment.

The full nature of this invention will be understood from the accompanying drawings and the following description and claim.

In the drawings Fig. 1 is a side elevational view of a tractor and an agricultural implement drawn thereby showing the invention applied thereto. Fig. 2 is an enlarged top plan view of the usual steering means and driver's seat of the tractor showing the invention associated therewith. Fig. 3 is a central sectional view of the invention shown in Fig. 2 and is taken on the line 3—3 of Fig. 2 and in the direction of the arrows. Fig. 4 is a sectional view showing the means for securing the attachment to the tractor steering wheel.

In the drawings 10 indicates a tractor provided with the usual steering wheel 11 and suitable clutch control means 12. The tractor by suitable means, such as the cable, chain or rod 13, is connected to an agricultural implement herein designated by the numeral 14, which implement carries the usual operator's seat 15. Adjacent the seat 15 is the usual control lever or handle 16 by which the cultivating means is adjusted to the work to be performed, as desired. All of the foregoing is old in the art and, therefore, it will be readily understood that two operators are required for the above combination, one operator to drive and control the tractor and the other operator to control the agricultural implement.

In order to permit a single operator to control both the tractor and the agricultural implement or either of their equivalents, there is provided means which are attached to the usual tractor controlling means and which extend towards the implement whereby the operator of the implement may simultaneously control the tractor element. In certain types of tractors, and particularly that class known as the "Fordson" it is to be noted that the clutch controlling mechanism is spring actuated in one direction;— that is, the control mechanism is normally maintained in the clutching position and the application of pressure, such as by the foot of the driver, will disengage the clutch and thus stop the tractor. By a suitable pulley arrangement herein indicated by the numerals 17 and 18, the cable 19 which extends from the tractor rearwardly towards the seat of the agricultural implement illustrated, is adapted to disengage the clutch by applying tension thereto. Thus, the tractor will continue to run when the cable 19 is slack, but will immediately stop when a pull is exerted upon said cable. The cable 19 is guided by a pulley 119 secured to the seat 30 to permit the same to be operated without interference or tangling.

The means for steering the tractor comprises a wheel here indicated by the numeral 20, including the rim portion and a flange 21. Depending from the rim portion are a plurality of parts or sockets 22 suitably slotted, as shown in Fig. 4 at 23. The wheel 20 is herein illustrated as superposed upon the usual steering wheel 11 which is supported in the usual manner by the supporting members or spider arms 24. As shown clearly in Fig. 4, the spider arm 24 is adapted to be received by the socket 23 and be rigidly secured therein by suitable means such as the set screw 25. Thus, the wheel 20 is adapted to be placed upon the steering wheel 11 and rotated in one direction until the sockets 23 register upon and receive the supporting arms 24 of the usual steering wheel construction. The superposed wheel is thereupon rigidly secured by the set screw 25. The rim portion 20 of the superposed wheel is preferably apertured in two places as at 26 and the cable ends 27 are knotted after being passed through the openings 26, thereby rigidly securing the cables 28 to the wheel 20. The cables 28 are wrapped around the wheel 20 and lie between the wheel 11 and the flange 21 and are retained upon the wheel by the aforesaid means. The apertured wheel provides a simple construction, since with wear and tear upon the cables 28 said cables will require replacement and said replacements may be easily made by inserting the free ends of the cables 28 through the openings 26 and thereafter knotting the same.

The cables 28 extend rearwardly from the steering wheel construction and pass over the seat 30 of the tractor. Upon the seat 30 is suitably secured a support 31 which pivotally supports a pulley wheel 32, which pulley wheel constitutes a guide for the cable 28. The cables 28 are of sufficient length to extend towards the seat of the agricultural implement 15 and both cables 28 may be gripped by the operator in one hand to turn the wheel 20 to the right or to the left to turn the tractor in a similar direction.

When it is not desired to move an agricultural implement with the tractor, the cables 28 are removed from the wheel, if desired, and it will be readily apparent that the wheel 11 may be operated with the same facility with the wheel 20 superposed thereon as if said superposed wheel were not so positioned. Similarly the pulleys 32, as shown in Fig. 3, may be moved from the pulley wheel position to the dotted line position, thereby permitting the driver of the tractor to be seated without discomfort.

The invention claimed is:

The combination of a steering wheel having a hand engageable rim for manual steering and a spider support, a detachable wheel in superposed relation to said steering wheel and having a flanged rim and a part depending from said flanged rim and adapted to engage the spider support, and means for securing the part to the spider support for rigidly securing the second mentioned wheel upon the steering wheel to form a pulley wheel with the flange and rim for remote manual control.

In witness whereof, I have hereunto affixed my signature.

DAYTON H. GILSON.